(No Model.)

J. H. SMITH.

PHOTOGRAPHIC CAMERA STAND.

No. 302,639. Patented July 29, 1884.

Witnesses:
C. C. Clements
W. C. Chaffee

Inventor:
James H. Smith
By C. O. Swett
Atty.

UNITED STATES PATENT OFFICE.

JAMES H. SMITH, OF QUINCY, ILLINOIS.

PHOTOGRAPHIC-CAMERA STAND.

SPECIFICATION forming part of Letters Patent No. 302,639, dated July 29, 1884.

Application filed August 20, 1883. (No model.)

*To all whom it may concern:*

Be it known that I, JAMES H. SMITH, a citizen of the United States, residing at Quincy, in the county of Adams and State of Illinois, have invented certain new and useful Improvements in Photographic-Camera Stands; and I do hereby declare the following to be a full, clear, and exact description of the invention, such as will enable others skilled in the art to which it appertains to make and use the same.

My invention relates to that form of camera-stand in which a rectangular frame mounted on rollers is furnished with an inner vertically-movable frame on which is placed the camera-bearing platform.

I desire to call my invention "The Automatic Camera-Stand," it having several novel self-acting features, which will hereinafter be explained.

The objects of my invention are to provide a camera-stand, at reasonable cost, which will be durable, attractive in appearance, and so constructed that the operator can easily and quickly adjust the platform to any desired height or inclination, one hand of the operator being usually sufficient to so adjust the machine.

Figure 1:
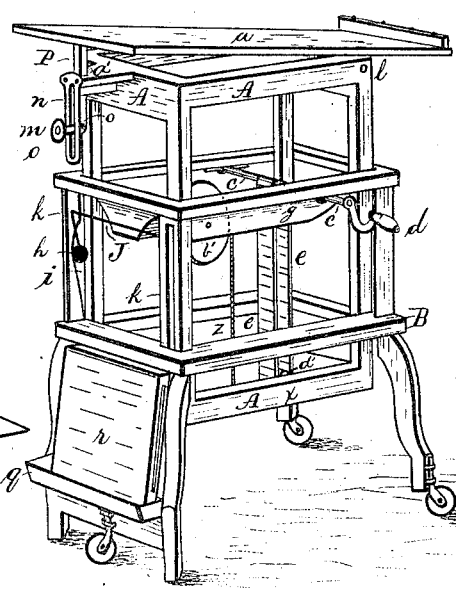

The various features of my invention are illustrated in the accompanying drawings, in which Figure 1 is an elevation of my camera-stand in perspective. The other figures of the drawings represent in detail various parts of the stand, and will be referred to as I proceed with the description.

The different parts of the machine are referred to by letters, similar letters indicating corresponding parts in the several views.

Figure 4:
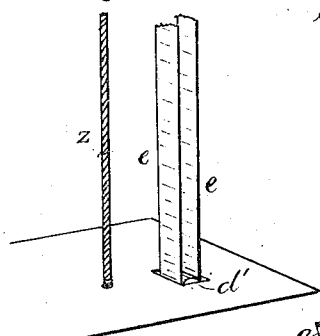

In Fig. 1, A is a rectangular frame adapted to move vertically in a supporting-frame, B, which is mounted on three rollers, to secure steadiness on uneven floors. The rear legs of the stand reach to within about one-quarter inch of the floor, to prevent the stand from being easily overturned. At the lower rear side I attach a tray, $q$, as a temporary rest for the plate-holder $r$. A shaft, $c$, journaled in hangers secured to the under side of the top of the frame B, extends from right to left across the stand. The shaft $c$ is operated by the crank $d$, and at about its middle is secured one end of the band $e$. The band $e$ passes downward beneath the roller $d'$, (see Fig. 4,) which is journaled in the bottom of the frame A, and then, extending upward, is fastened to the cross-frame $g$ on the main frame B. By turning the crank $d$ the frame A is raised or lowered.

Between the upper and lower sections, at the rear end of frame B, are set two posts, K K, their inward faces being cut to form, with the adjacent upright posts of the frame A, vertical wedge-shaped openings $i$ $i$. Cams or wheels $h$ $h$, connected by the bent wire J, occupy these openings. During an upward movement of the frame A these wheels turn loosely in the upper wider part of said openings $i$ $i$, but instantly stop any downward movement of the frame A by dropping into the narrow lower part of said openings and becoming wedged between the posts K K and the frame A. The wheels $h$ $h$ are freed by raising the rod or wire J, and the frame A is then unlocked and may be lowered again.

Figure 2:
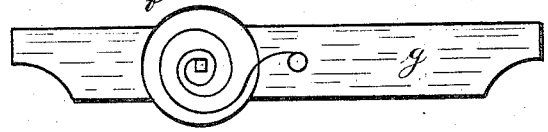

To the cross-frame $g$ is fixed the outer end of a coil-spring, $b$, (see Fig. 2,) the inner end of the spring being fastened to a grooved wheel, $b'$, journaled in the frame $g$, so that when the wheel $b'$ is turned the spring $b$ is wound up or unwound. One end of a cord, $z$, is removably attached by any ordinary means to the periphery of the wheel $b'$, and the other end is secured to the bottom of frame A. (See Fig. 4.) The object of these devices is to secure a tension by the spring $b$ to overcome a part or all of the weight of the frame A, with its superincumbent burden, and the tension is adjusted by disengaging the cord $z$, turning the wheel $b'$ in the proper direction and again attaching the cord $z$. Thus the use of a weight is obviated. I usually set the spring so that its resistance is slightly overcome by the gravity of the frame A and camera. Thus a very little power applied to the crank $d$ will raise the frame A.

Figure 3:

K' (see Fig. 3) is a bolster journaled at $l$ $l$ in the top of frame A. The front end of the platform or table $a$ is secured to this bolster, allowing its rear end to be raised or lowered.

P is a vertical support hinged to the under side of the table $a$, and passing down through an opening in the rear extension, $a'$, of frame A. The upper end of a vertically-slotted metal pendant, $n$, is fixed to the block $a'$.

Figure 5:
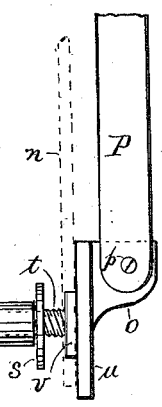

To the lower end of the piece P is pivoted a flange, $o$, on the screw-head $u$. (See Fig. 5.)

A square guide-block, $v$, is formed on the head $u$, to enter and move vertically in the slot in $n$. The hollow threaded shank $m'$ of the wheel or knob $m$ works upon the screw $t$. I use a washer, $s$, between the shank $m'$ and the pendant $n$. On turning the knob $m$ the screw-head $u$ is set against or released from any point along the slotted pendant $n$, and consequently, through the support P, the platform $a$ may be tilted to any desired angle, and this is easily accomplished with one hand of the operator.

I do not confine myself to the use of the locking device $h$ J K, above described, although I have found it preferable to any other, but find that a cam attached to the stationary frame and operating against the other, or a drop-catch and notches properly arranged will also effectually answer the purpose.

I am aware that camera-stands are usually made with one frame moving vertically within another, and that the use of cranks, belts, and springs is not new, and I do not broadly claim them as my invention. I do not, however, know of any camera-stand constructed as mine is, nor of any possessing the advantages and devices which I have herein set forth as novel.

I therefore claim and desire to secure by Letters Patent of the United States—

1. In a photographic-camera stand, the combination, with a main frame, B, and an inner vertically-moving frame, A, of the crank $d$, shaft $c$, cross-frame $g$, band $e$, and roller $d'$, and suitable means for locking together the frames A and B.

2. In a camera-stand, the combination, with the frames A B, of the posts K K on frame B, forming with the frame A the openings $i$ $i$, the rod J, and wheels or cams $h$ $h$, for the purposes herein described.

3. In a camera-stand, the combination, with the frames A B, of the crank $d$, shaft $c$, belt $e$, and roller $d'$, and the locking device consisting of the posts K K, rod J, and wheels or cams $h$ $h$, all arranged substantially as described.

4. In a camera-stand, a locking device consisting of the knob or wheel $m$, having the hollow threaded shank $m'$, screw-head $u$, block $v$, and screw $t$, in combination with the slotted pendant $n$ and the support P, attached to the table, as described.

5. In combination with the frame of a camera-stand, the bolster K', journaled in said stand, the platform $a$, hinged support P, block $a'$, slotted pendant $n$, knob $m$, threaded hollow shank $m'$, washer $s$, screw $t$, guide-block $v$, screw-head $u$, perforated flange $o$, and pivot $p$, arranged substantially as described.

6. The herein-described photographic-camera stand, formed of a main frame, B, and inner frame, A, and having suitable rollers, a tray, $q$, crank $d$, shaft $c$, cross-frame $g$, belt $e$, roller $d'$, posts K K, rod J, wheels $h$ $h$, spring $b$, grooved wheel $b'$, cord $z$, the bolster K', table $a$, hinged support P, block $a'$, slotted pendant $n$, knob $m$, hollow threaded shank $m'$, washer $s$, screw $t$, guide-block $v$, screw-head $u$, flange $o$, and pivot $p$, all arranged substantially as herein set forth.

JAS. H. SMITH.

Witnesses:
 FRANCIS M. PICKERILL,
 JOHN VERRAU.